(12) United States Patent
Vergara Martinez et al.

(10) Patent No.: US 11,384,835 B2
(45) Date of Patent: Jul. 12, 2022

(54) SWITCHING DEVICE FOR A TRANSMISSION

(71) Applicant: DEERE & COMPANY, Moline, IL (US)

(72) Inventors: Daniel Vergara Martinez, Coslada (ES); Javier Jose Perez Ramirez, Pinto (ES)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 17/223,418

(22) Filed: Apr. 6, 2021

(65) Prior Publication Data

US 2022/0007584 A1 Jan. 13, 2022

(30) Foreign Application Priority Data

Jul. 10, 2020 (EP) .................................. 20185266

(51) Int. Cl.
| F16H 63/32 | (2006.01) |
| F16H 63/30 | (2006.01) |
| F16H 61/30 | (2006.01) |
| F16H 63/04 | (2006.01) |
| A01D 69/02 | (2006.01) |

(Continued)

(52) U.S. Cl.
CPC ........... *F16H 63/32* (2013.01); *A01D 69/025* (2013.01); *A01D 69/06* (2013.01); *F16H 37/065* (2013.01); *F16H 61/30* (2013.01); *F16H 63/04* (2013.01); *F16H 63/302* (2013.01); *F16H 63/3023* (2013.01); *F16H 2063/3079* (2013.01); *F16H 2702/02* (2013.01)

(58) Field of Classification Search
CPC ................. F16H 63/32; F16H 63/02; F16H 2057/02056; F16H 2063/3079
See application file for complete search history.

(56) References Cited

U.S. PATENT DOCUMENTS

| 2,092,580 | A | 9/1937 | Kelley |
| 2,605,749 | A | 8/1952 | Buckendale |

(Continued)

FOREIGN PATENT DOCUMENTS

| CN | 102537332 A | 7/2012 |
| CN | 208348473 U | 1/2019 |
| FR | 2912795 A1 | 8/2008 |

OTHER PUBLICATIONS

European Search Report issued in counterpart European Patent Application No. 20185266.2 dated Dec. 22, 2020 (07 pages).

*Primary Examiner* — Tinh Dang

(57) ABSTRACT

A switching device for a transmission have a first and a second transmission housing portion. The switching device comprises a shift collar, a shift fork which engages in the shift collar, a control actuator which is arranged in the first transmission housing portion and an actuator rod which is connected at one end to the control actuator and at the other end to the shift fork. The actuator rod is supported in a first guiding hole which is formed in the first transmission housing portion. It is proposed that a second guiding hole which is formed in the first transmission housing portion parallel with the first guiding hole be formed and a guide rod which is orientated parallel with the actuator rod be provided and be connected at one end to the shift fork and at the other end be supported in the second guiding hole.

16 Claims, 8 Drawing Sheets

(51) Int. Cl.
*A01D 69/06* (2006.01)
*F16H 37/06* (2006.01)

(56) References Cited

U.S. PATENT DOCUMENTS

| | | | | |
|---|---|---|---|---|
| 4,974,468 A | * | 12/1990 | Reynolds | F16H 63/34 74/473.19 |
| 5,000,060 A | * | 3/1991 | Reynolds | F16H 63/34 74/331 |
| 5,435,212 A | * | 7/1995 | Menig | F16H 61/702 74/335 |
| 8,752,443 B2 | | 6/2014 | Bai et al. | |
| 2017/0086365 A1 | * | 3/2017 | Gonzalez-Mohino | A01D 69/025 |

* cited by examiner

SWITCHING DEVICE FOR A TRANSMISSION

RELATED APPLICATIONS

This claims priority to EP Application No. 20185266.2, titled Switching Device and a Transmission having such a Switching Device, filed Jul. 10, 2020, which is hereby incorporated by reference in its entirety.

FIELD OF THE DISCLOSURE

The present disclosure relates generally to a switching device for a transmission.

BACKGROUND OF THE DISCLOSURE

A transmission may have a first and a second transmission housing portions and a switching device. The switching device comprises a shift collar, a shift fork which engages in the shift collar, a control actuator which is arranged in the first transmission housing portion and an actuator rod which is connected at one end to the control actuator and at the other end to the shift fork. The actuator rod is supported in a first guiding hole which is formed in the first transmission (gear) housing portion.

Such switching devices are known and are used, for example, in agricultural vehicles, in particular in tractors or harvesting machines, such as combine harvesters or field choppers. Particularly in the combine harvesters, the transmissions are provided with the switching device in order to be able to switch the output rotation direction of the transmission from a first rotation direction into a reversed second rotation direction. The reversed rotation direction, that is to say, a reversal of the driving, is in principle only intended to be adjusted when specifically required, for example, in the event of blockages in the harvesting header and/or on the harvested material conveyor in the conveyor channel of the combine harvester. The switching devices generally make provision for a shift collar to be connected to a shift fork which can be displaced by means of a hydraulically controllable actuation cylinder. The shift fork is to this end secured to an actuator rod which is connected to the actuation cylinder and which is supported so as to be able to be axially displaced in guiding holes arranged in opposing housing halves of the switching device. In order to minimize a switching torque acting on the actuator rod when the shift collar is displaced, the shift fork is arranged between the guiding holes. This type of arrangement of the shift fork, actuator rod and guiding holes in both housing halves is at the expense of the compactness of the switching device and requires a relatively large structural space. In addition, the shift fork is generally connected to the actuator rod only at an outer location on the shift fork, whereby a relatively large bending torque acts on the shift fork and the actuator rod when the required actuation force for displacing the shift collar is intended to be applied. Furthermore, as a result of the only localized connection, the shift fork may also have a degree of rotational play with respect to the actuator rod, whereby the fork members of the shift fork can radially apply a load to the shift collar in a disadvantageous manner which, inter alia, leads to friction losses.

SUMMARY OF THE DISCLOSURE

The object forming the basis of the disclosure is considered to be to provide a switching device of the type mentioned in the introduction and a transmission by means of which the above-mentioned disadvantages are overcome.

It is proposed to construct a switching device of the type mentioned in the introduction in such a manner that a second guiding hole which is formed in the first transmission housing portion parallel with the first guiding hole is arranged and a guide rod which is orientated parallel with the actuator rod is provided and is connected at one end to the shift fork and at the other end is supported in the second guiding hole. This arrangement is particularly suitable for a transmission device having a small structural space, in which an arrangement of the second guiding hole for the actuator rod in the second transmission housing portion opposite the first guiding hole in the first transmission housing portion would be at the expense of the compactness of the transmission. As a result of the arrangement of the second guiding hole for the actuator rod parallel with the first guiding hole and the arrangement of a guide rod which is supported in the second guiding hole, the arrangement of a guiding hole for the actuator rod in the second transmission housing portion is prevented. The first transmission housing portion remains almost unchanged in terms of its structural depth, but in contrast the second transmission housing portion can be constructed with a smaller structural depth, whereby on the whole a smaller structural space can be achieved. In addition, the shift fork is thereby supported both by the actuator rod and by the guide rod so that the shift fork is retained concentrically relative to the shift collar and a rotational play of the shift fork with respect to the actuator rod and resultant friction losses between the shift fork and the shift collar are prevented. The wear on the shift fork and the shift collar is thereby reduced. Furthermore, as a result of an additional connection location of the shift fork and guide rod, which represents a support location for the shift fork with respect to the actuator rod, the bending torque acting on the shift fork and the actuator rod when the shift collar is displaced is minimized and the switching operation is thereby facilitated.

The first guiding hole is preferably formed between the control actuator and the shift fork. The guiding hole can thereby be constructed in a structurally technically advantageous manner as an integral component of the first transmission housing portion.

In order to ensure a switching position in a preferred direction, at least a first resilient element may be provided and urges the shift fork in the corresponding preferred direction. Should an actuation force which is applied to the actuator rod by the control actuator fail, for example, as a result of failure or as a result of a defect on the control actuator, the shift fork is urged by the actuation force applied by the resilient element in the preferred direction and retained in the corresponding switching position which is produced in the preferred direction provided. The control actuator may, for example, be constructed as a hydraulically activated actuation cylinder, having an actuation piston which is connected to the actuator rod. In the event of a failure of the hydraulics, the actuation force which is intended to be applied by the control actuator would fail so that the force applied by the resilient element acts as the only actuation force in the preferred direction. Alternatively, the control actuator could also be operated electrically, wherein, in the event of a failure of the electrical system, no actuation force is applied to the actuator rod by the control actuator and also in this instance the force applied by the resilient element acts as the only actuation force in the preferred direction. The preferred direction may, for example, be the switching direction in which the shift collar has to be moved in order to operate a harvesting header to receive harvested material. The switching direction which is opposite the preferred direction may then, for example, be a switching direction in which the shift collar has to be moved in order to achieve a reverse of the drive with a reversed rotation direction, for example, in the event of a clogging or blockage of the harvesting header and/or harvested material conveyor in the conveyor channel of the combine harvester.

The resilient element is preferably arranged between the first transmission housing portion and the shift fork. Alternatively, however, the resilient element could also be arranged in the control actuator and, for example, apply an actuation force to the actuation piston. In the event of a failure of the hydraulic or electrical system, an actuation force in the preferred direction originating from the resilient element would be maintained on the actuation piston.

Preferably, the resilient element is constructed as a pressure spring and extends at least partially in a spring guiding hole which is formed in the first transmission housing portion parallel with the first and second guiding holes. The pressure springs apply an actuation force to the shift fork by means of which the shift fork is moved or urged in the direction of the second transmission housing portion. The spring guiding hole acts, on the one hand, as a bending protection for a pressure spring which is, for example, constructed as a helical spring, but, on the other hand, also as an auxiliary assembly member since the insertion and assembly of the resilient element are facilitated.

In addition to the one or first resilient element, a second or additional resilient element may also be provided. Depending on the structural space and required actuation force, the number and dimensions of the resilient elements may vary, wherein the structural space between the shift fork and the first transmission housing portion advantageously enables the arrangement of a plurality of resilient elements. This has the advantage that the actuation force originating from the resilient elements can be configured in a very variable manner. The otherwise conventional arrangement of resilient elements in order to produce an actuation force in a preferred direction is carried out in the control actuator itself, for example, by a pressure spring which is arranged in a hydraulic chamber of the actuation piston. This type of arrangement is, however, limited by the construction type and construction size of the control actuator. Preferably, the same number of resilient elements are provided at both sides of the guide rod in order to prevent an action of torque on the guide rod and on the actuator rod. In a preferred embodiment, there are arranged two pressure springs which are constructed as helical springs and which are arranged at both sides of the guide rod. The spring guiding holes extend in the first transmission housing portion parallel with the second guiding hole. The pressure springs and the spring guiding holes are arranged in such a manner that the pressure springs engage at both sides of the shift fork. The pressure springs are in this instance sized in such a manner that, when an actuation force is not present or is deactivated from the hydraulically operated control actuator, a sufficiently large actuation force is generally applied by the pressure springs to the shift fork so that the shift fork and the shift collar can be moved in the preferred direction and the shift collar can be retained in the preferred switching position. It is thereby ensured that the drive connection to the harvesting header is maintained and the user also does not have to interrupt or can continue the harvesting work in the event of a failure of the hydraulic system.

A transmission which is provided with the above-described switching device preferably has a second transmission housing portion which is connected to the first transmission housing portion. An output shaft extends through the first and second transmission housing portions. A first drive element for the transmission can be connected to the output shaft by means of a planetary gear set. Furthermore, a second drive element can be connected to the output shaft. The transmission further has a gear which is connected to the output shaft in a rotationally secure manner and which is in engagement with a shift collar. In a first switching position, the shift collar is brought into engagement with the planetary gear set and the gear and, in a second switching position, the shift collar is brought into engagement with the second drive element and the gear.

Preferably, the first switching position, in which the shift collar is brought into engagement with the planetary gear set, is the switching position in the preferred direction or the switching position for the normal operation of the combine harvester.

The planetary gear set comprises a ring gear which is arranged on the second transmission housing portion, a planetary set which rolls in the ring gear, a planetary carrier which can be brought into engagement with the shift collar in the first switching position and a sun gear which is connected to the first drive element and which rolls with the planetary gears. Starting from the first drive element, in the first switching position the drive flow is consequently carried out via the sun gear and via the planet wheels which are rolling in the ring gear onto the planetary carrier and from there via the shift collar onto the gear of the output shaft. Starting from the second drive element, in a second switching position the drive flow is carried out via the shift collar onto the gear of the output shaft. The rotation direction of the drive shaft in the first switching position is counter to the rotation direction of the drive shaft in the second switching position in which the transmission is operated in reverse mode if, for example, the harvesting header and/or the harvested material conveyor is clogged or blocked in the conveyor channel of the combine harvester.

The first drive element is used for normal operation of the harvesting machine with a first rotation direction in which the harvesting header and the harvested material conveyor are operated to collect the harvested material. The first drive element may in this instance be constructed as a belt drive drum which is connected to the sun gear by means of a flange connection. Preferably, the belt drive drum is sized and constructed in such a manner that the transmission per se is substantially located in a hollow space surrounded by the belt drive disk.

The second drive element is used for reversal operation of the harvesting machine with a second, opposing rotation direction, in which the harvesting header and the harvested material conveyor are operated in the opposite direction in order, for example, to eliminate a blockage or clogging in the harvesting header and/or at the harvested material conveyor. The second drive element is constructed as a worm gear and is connected to a gear worm. Alternatively, another type of drive which is used in reverse mode could also be selected in this instance, for example, also a spur gear, hypoid gear, bevel gear and the like.

With reference to the drawings, which show an embodiment of the disclosure, the disclosure and other advantages and advantageous developments and configurations of the disclosure will be described below in greater detail and explained.

BRIEF DESCRIPTION OF THE DRAWINGS

The detailed description of the drawings refers to the accompanying figures in which.

DETAILED DESCRIPTION OF THE DRAWINGS

Figure 1:
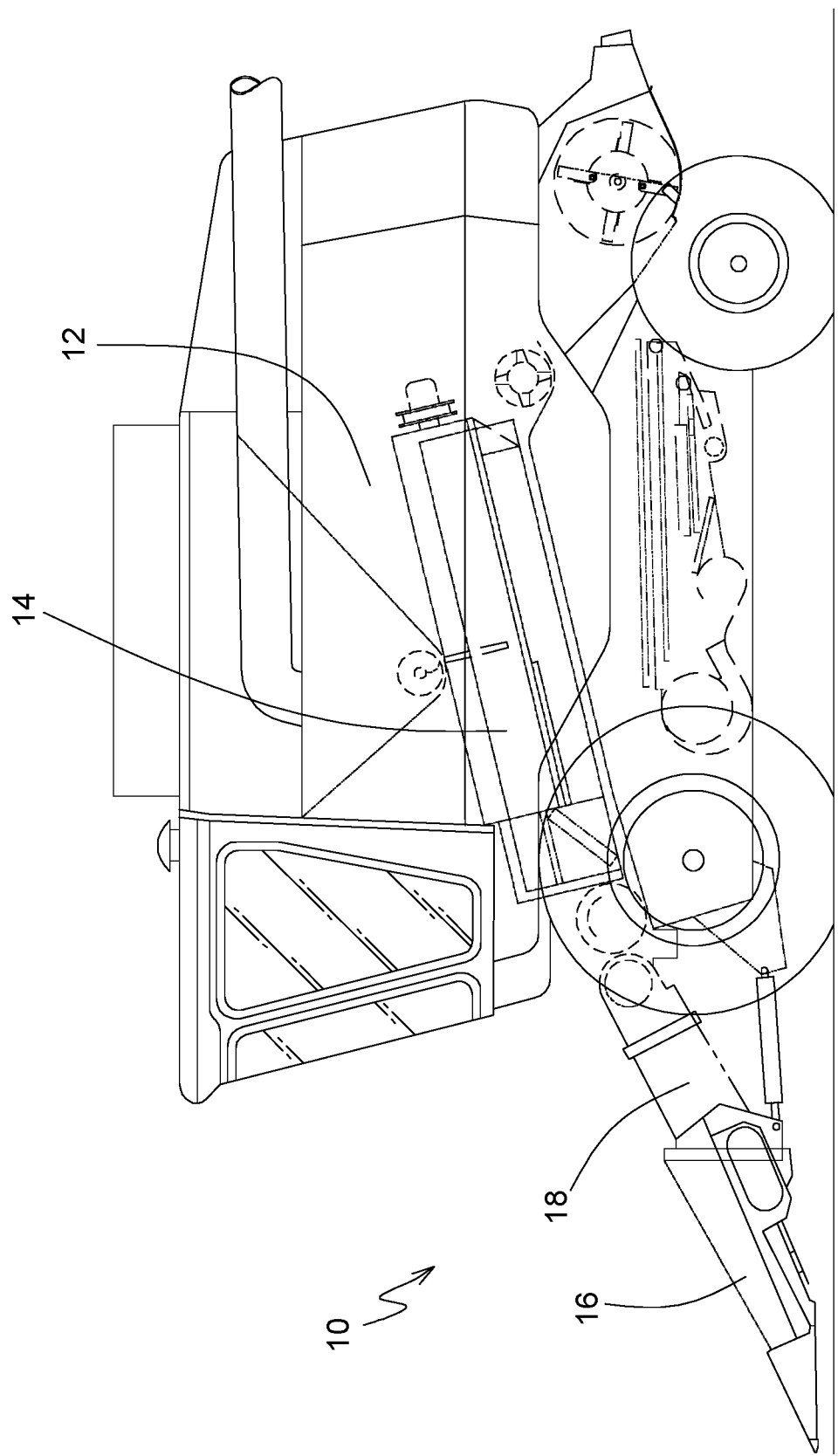
FIG. 1 is a schematic side view of a harvesting machine in the form of a combine harvester having a harvesting header and a feeding device on a conveyor channel.

FIG. 1 shows a self-propelled agricultural machine 10 which is constructed by way of example in the form of a combine harvester. It is also completely conceivable for the embodiment described in greater detail below also to be able to be constructed on another type of self-propelled agricultural machine, for example, a field chopper, a mower, a sugar cane harvester or a baler.

Figure 2:
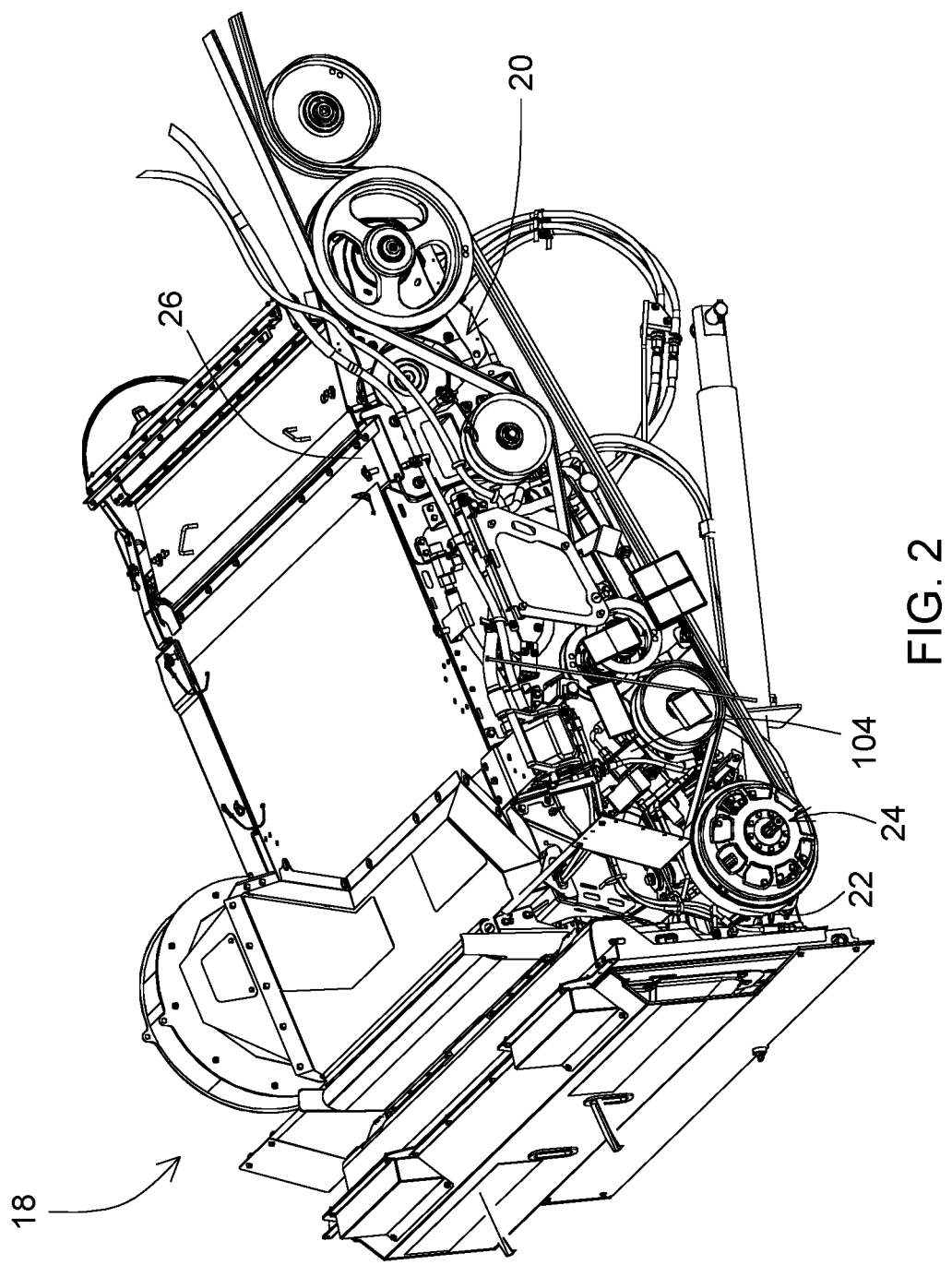
FIG. 2 is a schematic, perspective side view of the conveyor channel from FIG. 1 with a belt drive, harvested material conveyor and transmission for the drive of the harvesting header and the harvested material conveyor.
Figure 3:
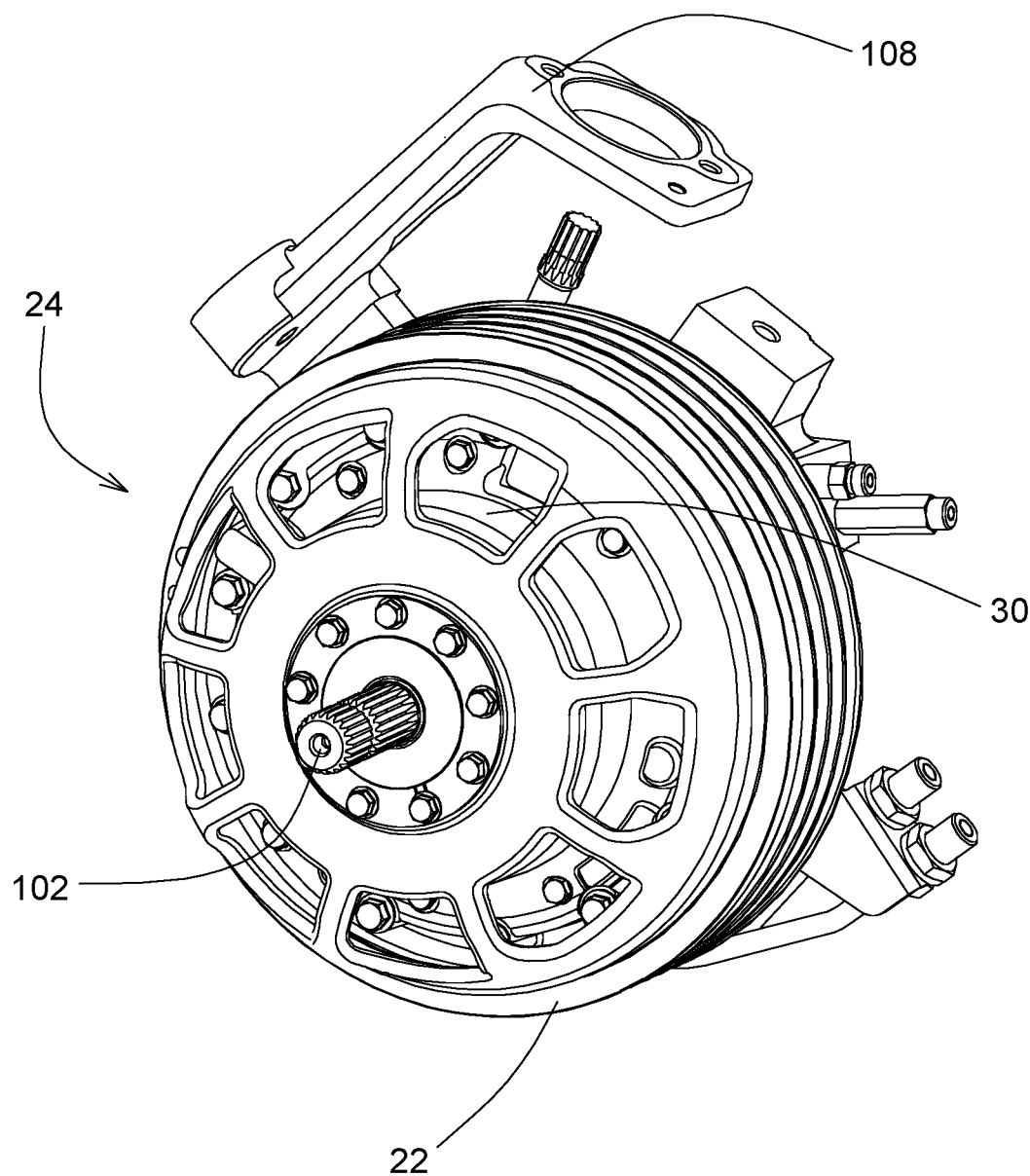
FIG. 3 is an enlarged, perspective front view of the transmission from FIGS. 1 and 2.
Figure 4:
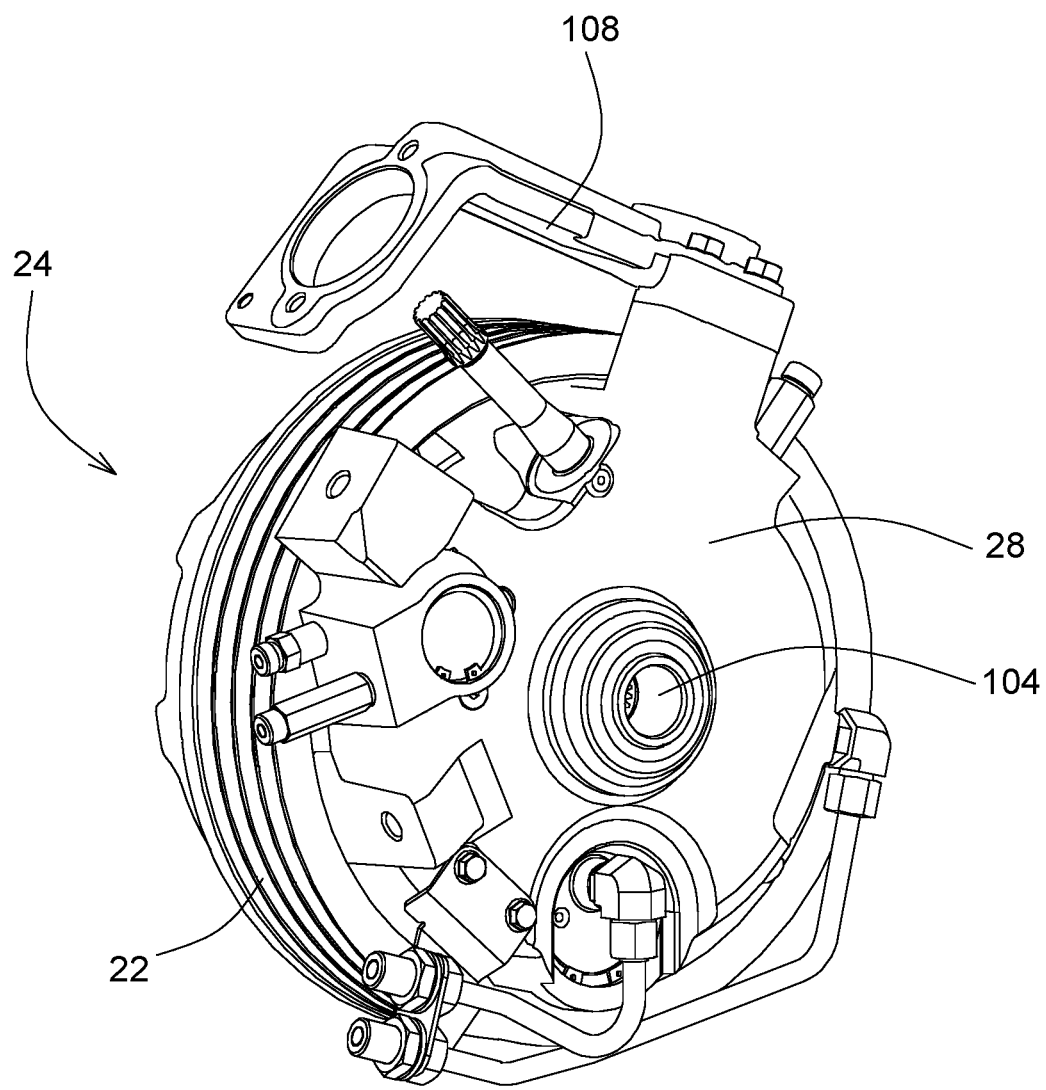
FIG. 4 is an enlarged perspective rear view of the transmission from FIGS. 1 and 2.

The agricultural machine 10 has a machine housing 12 and processing device in the form of a threshing device 14 having an axial rotor which is orientated in the longitudinal direction of the agricultural machine 10. The agricultural machine 10 is further provided with a harvesting header 16 which is connected to a conveyor channel 18 (see also FIG. 2). The agricultural machine 10 is driven by an internal combustion engine (not illustrated) from which inter alia a belt drive 20 which is arranged on the conveyor channel 18 branches off. A first drive element 22 in the form of a belt drive drum is driven via the belt drive 20 and is used as a drive element for a transmission 24 for driving the harvesting header 16 and for driving a harvested material conveyor 26 which is arranged in the conveyor channel.

The transmission 24 is illustrated in detail in FIGS. 3-8 and comprises, in addition to the first drive element 22 which is constructed as a belt drive drum, a first transmission housing portion 28 and a second transmission housing portion 30. A cylindrical rotation member 32 supported by a ball bearing 34 is arranged in the second transmission housing portion 30. The rotation member 32 is screwed at a first end 36 to the first drive element 22 (belt drive drum) and connected in a rotationally secure manner. At a second end 38 of the rotation member 32, a sun gear 40 of a planetary gear set 42 is connected to the rotation member 32 in a rotationally secure manner. The sun gear 40 is in engagement with a planet set 44 of the planetary gear set 42. The planet set rolls in a ring gear 46 which is incorporated in the second transmission housing portion 30. The planet set 44 is supported on a planetary carrier 48 which can be brought into engagement with a switching device 50.

The switching device 50 comprises inter alia a shift collar 52, a shift fork 54 which engages in the shift collar 52, a control actuator 56 which is arranged in the first transmission housing portion 28 and an actuator rod 58 which is connected at one end to the control actuator 56 and at the other end to the shift fork 54, wherein the actuator rod is supported in a first guiding hole 60 which is formed in the first transmission housing portion 28. Furthermore, a second guiding hole 62 is formed in the first transmission housing portion 28 parallel with the first guiding hole 60. In the second guiding hole 62, in a state arranged parallel with the actuator rod 58, a guide rod 63 is provided and is also connected at one end to the shift fork 54 and is supported at the other end in the second guiding hole 62.

The above-described arrangement of the switching device 50 is particularly suitable for a transmission 24 having a small structural space and a compact construction type in which an arrangement of the second guiding hole 62 for the actuator rod 58 is also formed in the first transmission housing portion 28. As a result of the arrangement of the second guiding hole 62 for the actuator rod 58 parallel with the first guiding hole 60 together with the guide rod 63 which is supported in the second guiding hole 62, the arrangement of a second guiding hole for the actuator rod 58 in the second transmission housing portion 30 is prevented. The first transmission housing portion 28 nonetheless remains almost unchanged in terms of its structural depth whilst in contrast the second transmission housing portion 30 can be constructed with a relatively small structural depth, whereby on the whole a small structural space is achieved. In addition, the shift fork 54 is supported both by the actuator rod 58 and by the guide rod 63 so that the shift fork 54 is retained concentrically relative to the shift collar 52 and a rotational play of the shift fork 54 with respect to the actuator rod 58 and resultant friction losses between the shift fork 54 and shift collar 52 are prevented. The wear on the shift fork 54 and the shift collar 52 is thereby reduced. Furthermore, the connection of the guide rod 63 to the shift fork 54 provides a support location with respect to the actuator rod 58 which minimizes a bending torque acting on the shift fork 54 and on the actuator rod 58 when the shift collar 52 is displaced and thereby facilitates a switching operation.

The control actuator 56 is constructed as a dual-action hydraulic cylinder having a first and a second pressure chamber 64, 66 which are separated from each other by means of an actuation piston 68. The first pressure chamber 64 is constructed with respect to a transmission view illustrated in FIGS. 5 and 6 at the left of the actuator piston 68. The second pressure chamber 66 is constructed with respect to a transmission view illustrated in FIGS. 5 and 6 at the right of the actuator piston 68. The actuator piston 68 is connected to the actuator rod 58. Depending on the filling of the first or second pressure chamber 64, 66, the actuator piston 68 moves into a first switching position (see FIGS. 5 and 8) or into a second switching position (see FIG. 6).

Figure 8:
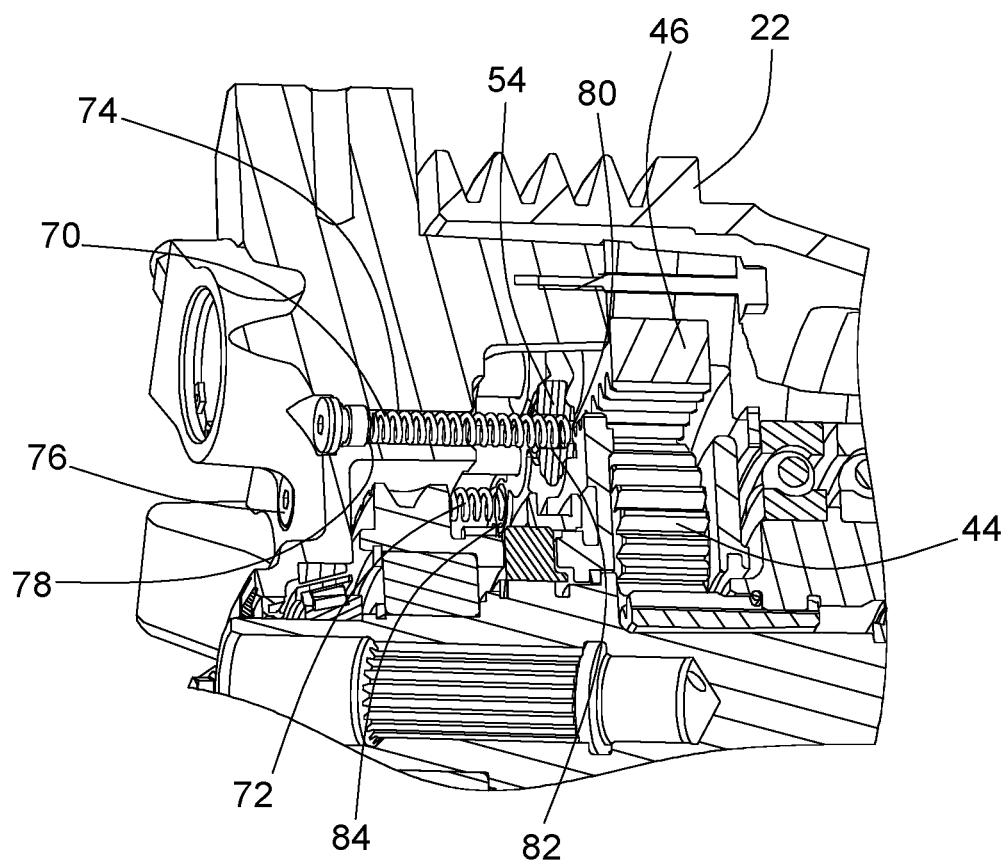
FIG. 8 is a perspective cross-sectional view of the transmission from FIGS. 1 and 2 in a third cross-section plane for the first switching position.

As illustrated in FIG. 8, in the first transmission housing portion 28 at the side of the guide rod 63 a first and second resilient element 70, 72 which is constructed in each case as a pressure spring are arranged. In order to guide and retain the resilient elements 70, 72, there are arranged in the first transmission housing portion 28 a first and a second spring guiding hole 74, 76 in which the respective resilient elements 70, 72 partially extend. The resilient elements 70, 72 are retained at a first spring end 78 in the respective spring guiding hole 74, 76 and at a second spring end 80 in a first and second engagement hole 82, 84 which are arranged on the shift fork 54. The resilient elements 70, 72 consequently extend starting from the first transmission housing portion 28 in the direction of the shift fork 54 and apply a clamping force in the direction of the second transmission housing portion 30, wherein the resilient elements 70, 72 urge the shift fork 54 into the first switching position or with pressure-free pressure chambers 64, 66 of the control actuator 56 retain the shift fork 54 and consequently also the shift collar 52 in the first switching position.

Figure 5:
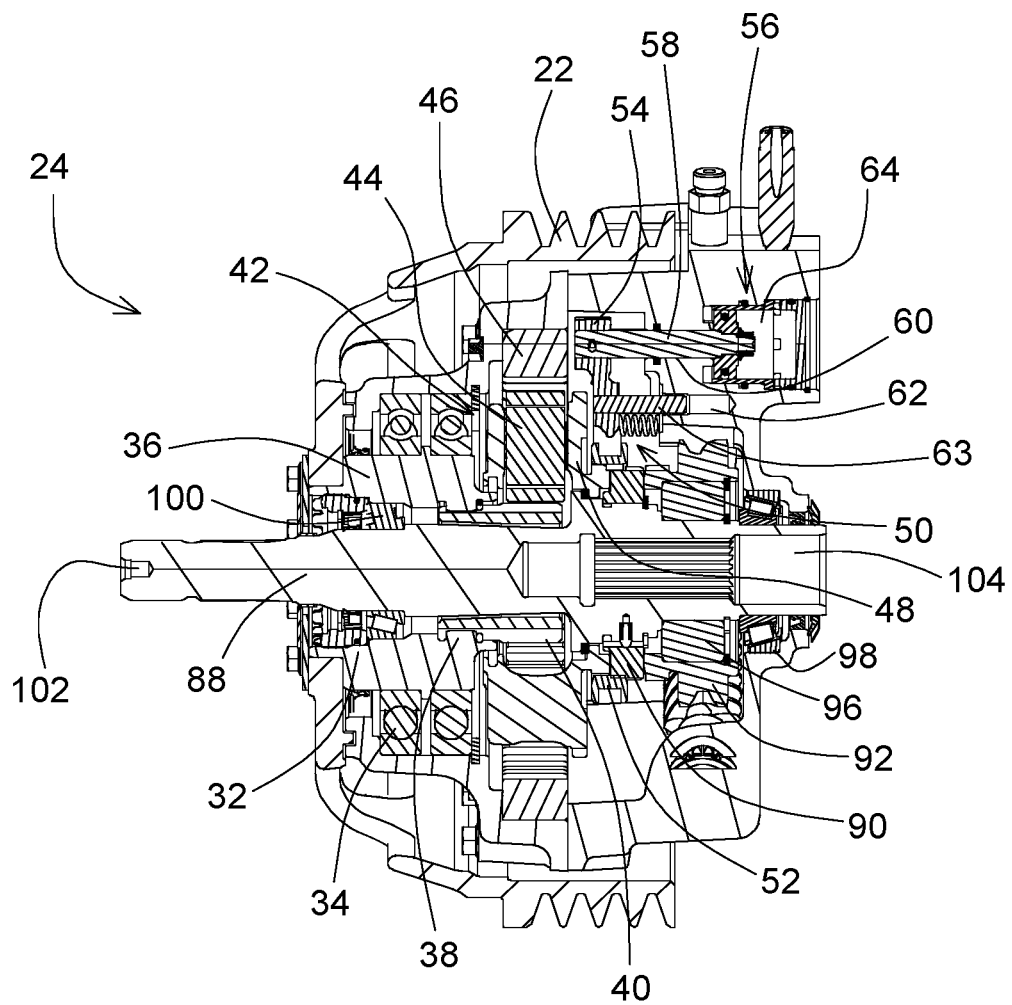
FIG. 5 is an enlarged cross-sectional view of the transmission from FIGS. 1 and 2 in a first cross-section plane for a first switching position.
Figure 6:
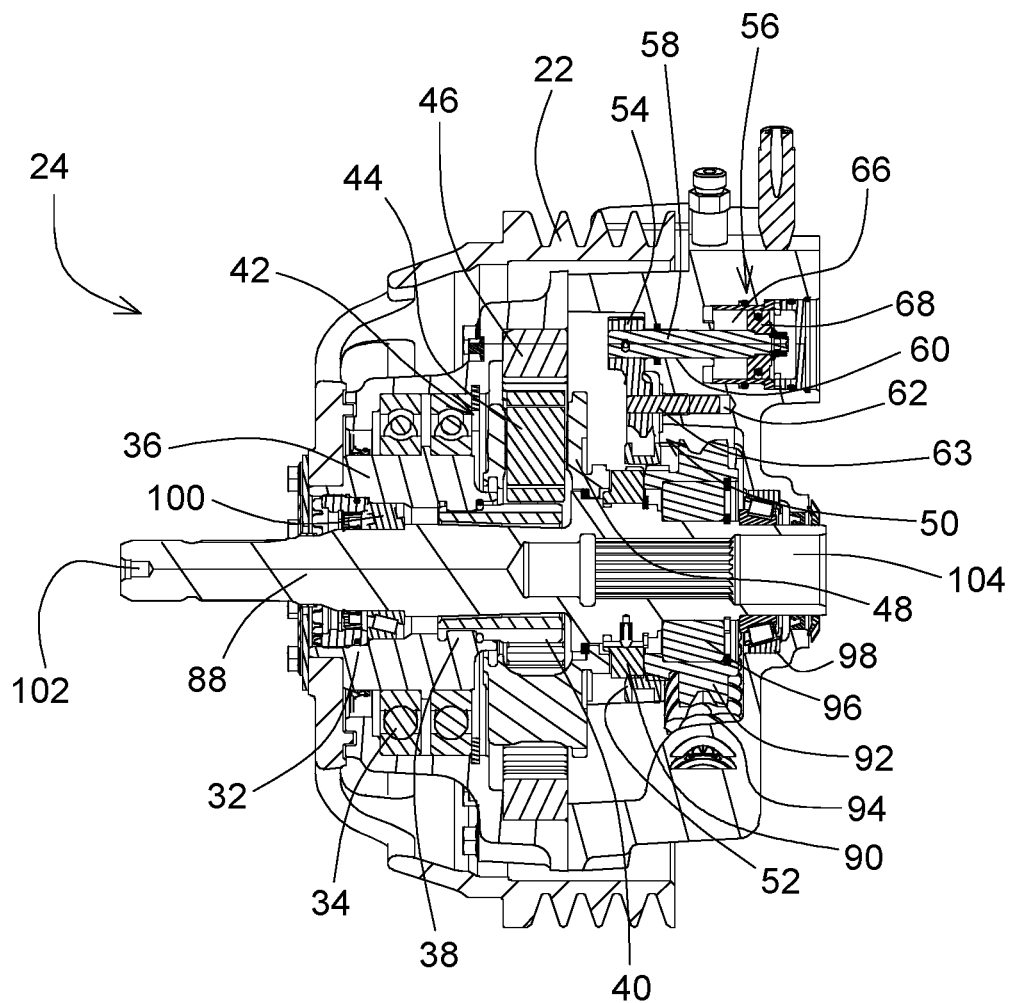
FIG. 6 is an enlarged cross-sectional view of the transmission from FIGS. 1 and 2 in the first cross-section plane for a second switching position.
Figure 7:
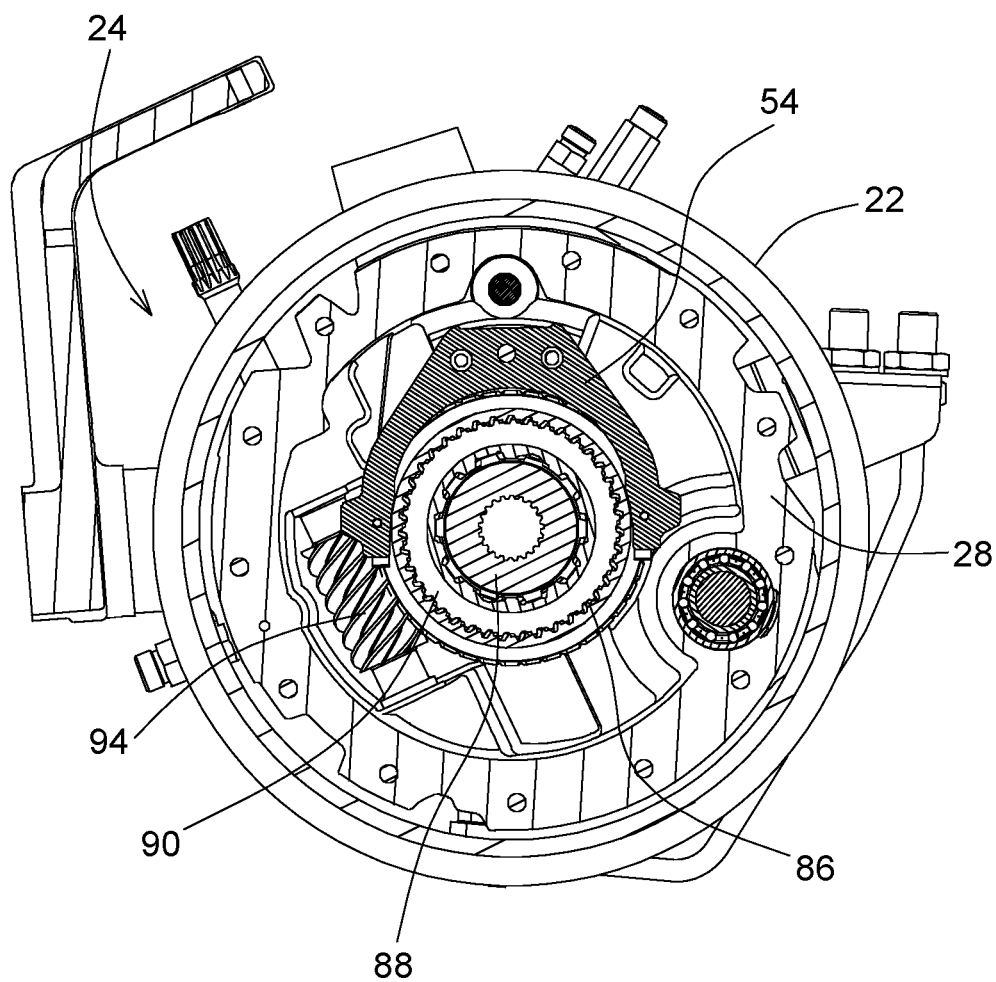
FIG. 7 is another enlarged cross-sectional view of the transmission from FIGS. 1 and 2 in a second cross-section plane.

The shift collar 52 has an internal tooth arrangement 86 and is supported therewith on a gear 90 which is connected to an output shaft 88 in a rotationally secure manner so as to be able to be axially displaced on the gear 90 relative to the output shaft 86. As can be seen in FIGS. 5 and 8, the shift collar 52 is in engagement in the first switching position with one half with the planetary carrier 48 and with the other half with the gear 90. By axially displacing the shift collar 52, it can be released from engagement with the planetary carrier 48 and be moved into the second switching position, as illustrated in FIG. 6. In the second switching position, the shift collar 52 is in engagement with one half with a second drive element 94 which is arranged on the output shaft 88 in the form of a worm gear (see also FIGS. 7 and 8) and with the other half with the gear 90. The second drive element 92 in the form of the worm gear is drivingly connected to a gear worm 94 and is supported on the output shaft 88 by means of a ball bearing 96.

The output shaft 88 is supported by means of a first roller bearing 98 on the first transmission housing portion 28 and by means of a second roller bearing 100 on the rotation member 32. The output shaft 88 extends in terms of its length through the first and the second transmission housing portions 28, 30 and has a first output connection 102 at the output of the second transmission housing portion 30 and a second output connection 104 at the output of the first transmission housing portion 28, wherein the first output connection 102 is provided for connection to the harvesting header 16 and the second output connection 104 is provided for connection to the harvested material conveyor 26.

As can be seen in the Figures, the belt drive drum is constructed in such a bulbous manner that it completely surrounds the second transmission housing portion 30 and at least partially surrounds the first transmission housing portion. A compact construction type of the transmission 24 is thereby ensured.

The drive of the second drive element 92 is carried out via an electric motor 106 which is retained by means of a retention member 108 which is arranged on the first transmission housing portion 28. A drive of the second drive element 92 via the electric motor is carried out in reverse mode, for example, when the harvesting header or the harvested material conveyor is blocked or clogged. In reverse mode, the shift collar 52 is moved into the second switching position or brought into engagement with the gear 90 and the second drive element 92, wherein the drive is uncoupled at the first drive element (belt drive drum) and, as a result of the arrangement described above of the various transmission components, a rotation direction of the output shaft 88 counter to normal operation is achieved.

The above-described resilient elements 70, 72 serve to ensure an actuation force in a preferred direction, which ensures a switching position for the normal operation of the agricultural machine 10 when the hydraulic supply of the control actuator 56 fails. In addition to the resilient elements 70, 72 illustrated, in order to produce a greater actuation force, additional resilient elements and corresponding spring guiding holes or larger resilient elements and larger guiding holes may also be provided. Depending on the structural space and required actuation force, the number and size of the resilient elements 70, 72 can consequently be varied. The resilient elements 70, 72 and the spring guiding holes 74, 76 are arranged in such a manner that the resilient elements 70, 72 engage at both sides of the shift fork in the engagement holes 82, 84 with tension. The resilient elements 70, 72 are sized in such a manner that, when the actuation force is not present or is deactivated, as a result of the resilient elements 70, 72 a sufficiently large actuation force is still generally applied to the shift fork 54 by the hydraulically operated control actuator 56 so that the shift fork 54 and the shift collar 52 can be moved in the preferred direction and the shift collar 52 can be retained in the preferred switching position (first switching position). It is thereby ensured that the drive connection to the harvesting header 16 is maintained and the user also does not have to interrupt or can continue the harvesting work in the event of a failure of the hydraulic system.

In the embodiment described above, the first switching position in which the shift collar 52 is moved into engagement with the planetary gear set 42 is the switching position in the preferred direction or the switching position for the normal operation of the agricultural machine 10. The second switching position, in which the shift collar 52 is moved into engagement with the second drive element 92, represents the reverse mode.

Starting from the first drive element 22, in the first switching position the drive flow is consequently carried out via the sun gear 40 and via the planetary set 44 which rolls in the ring gear 46 onto the planetary carrier 48 and from there via the shift collar 52 onto the gear 90 of the drive shaft 88. Starting from the second drive element 92, in the second switching position the drive flow is carried out via the shift collar 52 onto the gear 90 of the output shaft 88. The rotation direction of the drive shaft 88 in the first switching position is counter to the rotation direction of the drive shaft 88 in the second switching position, in which the transmission is operated in reverse mode, if, for example, the harvesting header and/or the harvested material conveyor in the conveyor channel of the combine harvester is clogged or blocked.

The switching of the switching device 50 is carried out by means of hydraulic application of pressure and depressurization of the pressure chambers 64, 66, wherein with depressurization of the second pressure chamber 66 and/or where applicable simultaneous pressure application to the first pressure chamber 64 the actuator rod 58 and consequently the shift fork 54 and the shift collar 52 are moved in the direction of the first switching position for the normal operation in which the shift collar 52 is moved into driving connection with the planetary gear set 42 (see FIG. 5). In the event of application of pressure to the second pressure chamber 66 and/or where applicable depressurization of the first pressure chamber 64, the actuator rod 58 and consequently the shift fork 54 and the shift collar 52 are moved in the direction of the second switching position for reverse mode in which the shift collar 52 is moved into driving connection with the second drive element 92. The pressure application for the first pressure chamber 64 may be low or, depending on the configuration of the resilient elements 70, 72, be dispensed with completely since the resilient elements 70, 72, as described above, already urge the actuator rod 58 into the first switching position. The resilient elements 70, 72 are, however, preferably configured in such a manner that, in the event of a failure of the hydraulic system during normal operation, only an independent displacement of the shift collar 52 from the first switching position is prevented, but an application of pressure to the first pressure chamber 64 in order to switch from the second switching position into the first switching position is intended to be carried out. A degree of switching dynamic is thereby intended to be ensured. The application of pressure for the second pressure chamber 66 in order to switch into the second switching position must in contrast be greater since the actuator rod 58 has to be moved counter to the actuation force of the resilient elements 70, 72.

What is claimed is:

1. A switching device for a transmission having a first and a second transmission housing portions, the switching device comprising:
   a shift collar,
   a shift fork which engages in the shift collar,
   a control actuator which is arranged in the first transmission housing portion, and
   an actuator rod which is connected at one end to the control actuator and at the other end to the shift fork,
   wherein the actuator rod is supported in a first guiding hole which is formed in the first transmission housing portion, wherein a second guiding hole which is formed in the first transmission housing portion parallel with the first guiding hole is formed and a guide rod which is orientated parallel with the actuator rod is provided and is connected at one end to the shift fork and at the other end is supported in the second guiding hole.

2. The switching device as claimed in claim 1, wherein the first guiding hole is formed between the control actuator and the shift fork.

3. The switching device as claimed in claim 1, comprising at least one resilient element which urges the shift fork into a switching position of a preferred direction.

4. The switching device as claimed in claim 3, wherein the resilient element is arranged between the first transmission housing portion and the shift fork.

5. The switching device as claimed in claim 3, wherein the resilient element is constructed as a pressure spring and extends at least partially in a spring guiding hole which is formed in the first transmission housing portion parallel with the first and second guiding holes.

6. The switching device as claimed in claim 3, comprising a second resilient element.

7. The switching device as claimed in claim 2, comprising at least one resilient element which urges the shift fork into a switching position of a preferred direction.

8. The switching device as claimed in claim 7, wherein the resilient element is arranged between the first transmission housing portion and the shift fork.

9. The switching device as claimed in claim 8, wherein the resilient element is constructed as a pressure spring and extends at least partially in a spring guiding hole which is formed in the first transmission housing portion parallel with the first and second guiding holes.

10. The switching device as claimed in claim 7, wherein the resilient element is constructed as a pressure spring and extends at least partially in a spring guiding hole which is formed in the first transmission housing portion parallel with the first and second guiding holes.

11. A transmission having the switching device as claimed in claim 1.

12. The transmission as claimed in claim 11, having the first transmission housing portion and the second transmission housing portion which is connected to the first transmission housing portion, an output shaft which extends through the first and second transmission housing portions,
    a first drive element which can be drivingly connected by means of a planetary gear set to the output shaft,
    a second drive element which can be drivingly connected to the output shaft and a gear which is connected to the output shaft in a rotationally secure manner and which is in engagement with the shift collar,
    wherein in a first switching position the shift collar can be brought into engagement with the planetary gear set and the gear and in a second switching position the shift collar can be brought into engagement with the second drive element and the gear.

13. The transmission as claimed in claim 12, wherein the first switching position is the switching position in a preferred direction.

14. The transmission as claimed in claim 12, wherein the planetary gear set comprises a ring gear which is arranged on the second transmission housing portion, a planetary set which rolls in the ring gear, a planetary carrier which can be brought into engagement with the shift collar in the first switching position and a sun gear which is connected to the first drive element and which rolls with the planetary set.

15. The transmission as claimed in claim 12, wherein the first drive element comprises a belt drive drum.

16. The transmission as claimed in claim 12, wherein the second drive element comprises a worm gear which is driven by a gear worm.

* * * * *